March 16, 1926.

J. F. FLAHERTY 1,576,589

ROLL GRINDING MACHINE

Filed July 12, 1920.   7 Sheets-Sheet 1

Inventor
JOHN F. FLAHERTY.
by B. M. Kent
Attorney

March 16, 1926.

J. F. FLAHERTY

ROLL GRINDING MACHINE

Filed July 12, 1920

Inventor
JOHN F. FLAHERTY.

March 16, 1926. 1,576,589
J. F. FLAHERTY
ROLL GRINDING MACHINE
Filed July 12, 1920 7 Sheets-Sheet 6

Inventor
JOHN F. FLAHERTY.
Attorney

Patented Mar. 16, 1926.

1,576,589

UNITED STATES PATENT OFFICE.

JOHN F. FLAHERTY, OF TOLEDO, OHIO, ASSIGNOR TO THE BOCK BEARING COMPANY, OF TOLEDO, OHIO, A CORPORATION OF OHIO.

ROLL-GRINDING MACHINE.

Application filed July 12, 1920. Serial No. 395,539.

*To all whom it may concern:*

Be it known that I, JOHN F. FLAHERTY, a citizen of the United States, and a resident of Toledo, county of Lucas, State of Ohio, have invented new and useful Improvements in Roll-Grinding Machines, of which the following is a specification.

This invention relates to grinding machines and has for its principal object the provision of a machine adapted to securely grind an end surface on an elongated article, such as a tapered roller for an antifriction bearing.

A further object is to provide a machine capable of grinding a beveled or spherical surface on the end of an article.

A further object is to provide a machine of this type with a wheel dressing device, adapted to be quickly and conveniently operated, to true up the grinding wheels.

A further object is to provide an improved work-holder, whereby the work may be accurately positioned and held.

A further object is to provide a machine that can be economically manufactured and operated and which will be subject to very slight wear and provided with convenient adjustments, whereby any wear that may occur can be compensated for, so as to have the machine operate accurately over long periods.

Other objects of the invention and the features of novelty will be apparent from the following description, taken in connection with the accompanying drawings; in which:—

Referring to the drawings, 20 indicates the bed or frame of the machine, on the top of which ways 21 and 22 are provided for the reciprocating carriage 23. The way 22 is preferably of the V-type, as is common in machine tool construction, so as to prevent lateral displacement of the carriage. A shaft 24 is arranged in bearings 25, 26 and 27 in the lower part of the bed 20 and carries a barrel-cam 28 with which the roller 29 on the lower end of the lever 30 cooperates. The lever 30 has its upper end keyed to a shaft 31 mounted in bearings 32 and 33 in the bed 20. The shaft 31 also has keyed thereto an upwardly extending arm 34 at the top of which is a gear sector 35 which meshes with a rack 36 on the carriage 23. The rack 36 is adjustable on the carriage 23 by means of a screw 37 on the shaft 38, the shaft being mounted in bearings 39 and 40 on the carriage 23 and being held against axial movement in one direction by the collar 41, but having a slight movement in the opposite direction, by virtue of the spring 42 which bears on the nut 43 on the end of the shaft 38. A gear 44 is mounted on shaft 38 and meshes with a pinion 45 on a short shaft 46, the exposed ends of the shafts 38 and 46 being made square, to receive a wrench for turning these shafts. By applying the wrench directly to the shaft 38, the rack 36 may be quickly traversed with reference to the carriage 23, while by applying the wrench to the shaft 46, the ratio of the gears 44 and 45 enables a very fine adjustment of the rack 36.

The bed 20 has an opening 47 opposite the cam 28 to permit access to the latter, and this opening is normally closed by a door 48. Keyed to the shaft 24 is a gear 49, which is drivin by a pinion 50 on the shaft 51 which is mounted in bearings 52 and 53 and also has arranged thereon a gear 54. A pinion 55, on the shaft 56, meshes with the gear 54 and drives the latter. The shaft 56 is mounted in bearings 57 and 58, and is adapted to be driven by a pulley 59, through a clutch 60, of any suitable construction. A lever 61 on the exterior of the bed 20 is secured to the shaft 62 and is adapted to actuate the clutch 60 through the linkage 63, which may be of any preferred type.

Figures 6, 10:
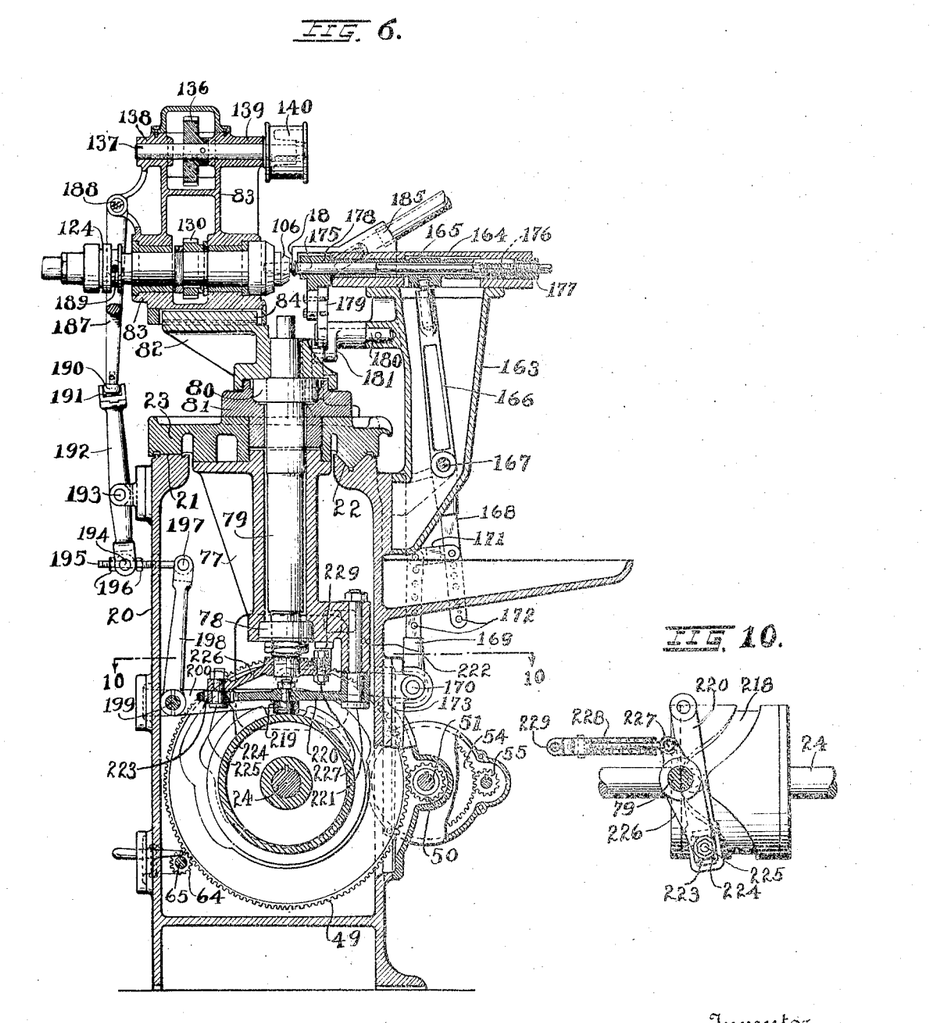
Fig. 6 is a transverse section on the line 6—6 of Fig. 3.
Fig. 10 is a detail plan of the oscillating mechanism for the work-holder as seen from the plane 10—10 of Fig. 6.
Figure 7:
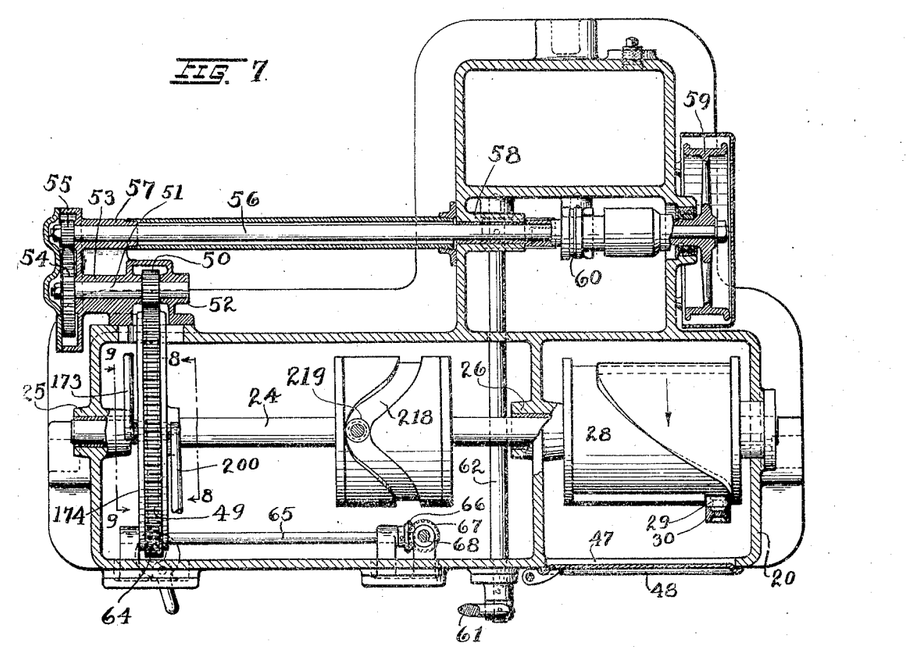
Fig. 7 is a horizontal section on the line 7—7 of Fig. 2.
Figure 8:
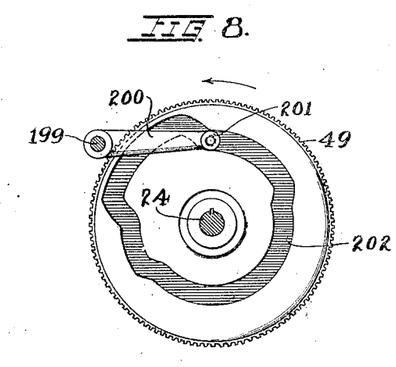
Fig. 8 is a side elevation of one of the cams as seen from the plane 8—8 of Fig. 7.
Figure 9:
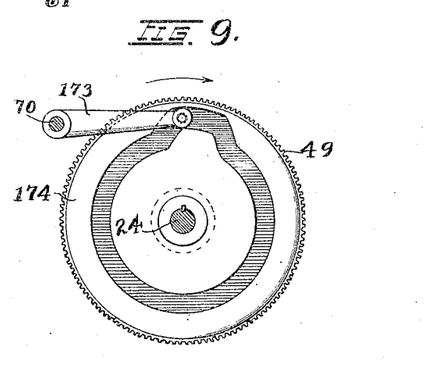
Fig. 9 is a side elevation of another cam as seen from the plane 9—9 of Fig. 7.

A pinion 64 (see Fig. 6), is mounted on a shaft 65 and meshes with the gear 49. The shaft 65 also carries a bevel gear 66, which meshes with a gear 67 on the vertical shaft 68 which is geared to a shaft 69 by a pair of bevel gears 70. The shaft 69 is mounted in a bearing 71 and has its outer end squared to receive a wrench, whereby the shaft 24 may be rotated to traverse the carriage 23 by hand.

Figure 12:
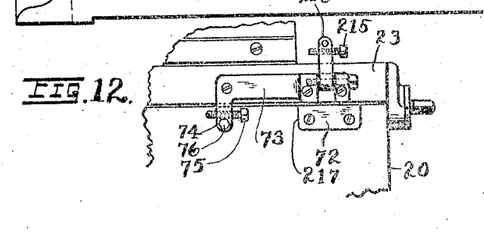
Fig. 12 is a fragment of Fig. 1.

A block 72 (see Fig. 12), is secured to the bed 20 adjacent the upper edge of the latter, and a bracket 73 on the carriage 23 has a downwardly extending arm 74 which carries a screw 75, adjustable in the arm 74 and adapted to be secured by a set screw 76. The screw 75 acts as a stop for the movement of the carriage 23 toward the right, as seen in Fig. 12, by engagement with the end 217 of the block 72, and to insure this engagement without undue straining of the mechanism which reciprocates the carriage 23, the spring 42, previously described, is provided, which permits a slight movement of the rack 36, after the movement of the carriage has been interrupted by the stop 75.

The carriage 23 carries on its under side, within the bed 20, a bracket 77, at the lower end of which is a bearing 78 for the vertical shaft 79, the upper end of this shaft being supported by a bearing 80, which is mounted in the block 81 secured to the upper side of the carriage 23. Secured on the upper end of the shaft 79 is a bracket 82 on which a housing 83 is slidably mounted, by means of the dovetail 84.

A hollow spindle 85 is mounted in bearings 86 and 87 in the housing 83 and has an extension 88 threaded into one end thereof. The opposite end of the spindle 85 is enlarged, to provide a thrust shoulder 89 which bears against one end of the bearing 86 and cooperates with a thrust collar 90 which is held on the spindle by means of the nuts 91 and 92 and which engages the end of the bearing 87, to hold the spindle against axial movement in either direction. A dowel 93 connects the thrust collar 90 with the nut 91 so as to cause the thrust collar to rotate with the spindle.

The bearings 86 and 87 are adjustable for wear so as to hold the spindle 85 against lateral movement and, while any suitable means of adjustment may be used, I prefer to use the construction illustrated, which is claimed in my co-pending application, Serial No. 395,540, filed July 12, 1920. The same adjustment is used on both of the bearings 86 and 87 and, therefore, a description of one will be sufficient. A flange on the bearing cooperates with the shoulder 94 in the housing 83, to hold the bearing against axial movement in one direction. The bearing is split and in the split is provided a threaded opening for the tapered end of the screw plug 95, this screw plug positively holding the bearing against contraction but, upon being backed out, will permit a certain amount of contraction, owing to the tapering of the end of the screw. The outer surface of the bearing is tapered, as indicated at 96, and has arranged thereon a sleeve 97 that is provided with a tapered bore and a cylindrical outer surface which fits the bore 98 of the housing 83. The sleeve 97 has a slot 99 through which the screw plug 95 projects and also has one end threaded, as indicated at 100, to receive the nut 101 which bears against a shoulder on the housing 83 and cooperates with the shoulder 94 to hold the bearing from axial movement in either direction. The bearing 86 has a threaded end 102 on which there is a nut 103 which bears against the end of the sleeve 97, to hold the latter against axial movement relative to the bearing.

The construction just described enables the bearing 86 to be contracted on the spindle 85, to compensate for wear, and to make this adjustment, the screw plug 95 is backed out slightly and the nut 101 loosened. The nut 103 is then turned to force the sleeve 97 onto the bearing to contract the latter, the engagement of the flange on the bearing with the shoulder 94 holding the bearing against axial movement when this adjustment is made. When the bearing has been contracted sufficiently, the nut 101 is again tightened and the parts will be retained in their adjusted position. It will be understood that in making this adjustment, the screw plug 95 will be backed out only such an amount as will permit the required adjustment, so that when the adjustment is completed, the screw plug will positively hold the split in the bearing with the desired amount of opening.

A cap 104 is arranged over the exposed end of the screw plug 95 to prevent the latter from being turned accidentally and to prevent dirt from getting into the bearing.

Arranged within the spindle 85 and the extension 88, but rotatable therewith, is an axially shiftable tubular member or sleeve 105, one end of which is enlarged, to receive the head 106 which has a screw threaded connection at 107 therewith. The head 106 has a conical bore 108 which cooperates with the conical exterior of the split collet 109, which is adapted to receive the work A therein and securely hold it by its gripping action thereon. The collet 109 has a threaded connection at 110 with the tubular member 111, and the latter has a threaded connection at 112 with the rod 113. The rod 113 has its outer end threaded, so as to be adjustable in the cap 114 at the outer end of the spindle extension 88. A lock nut 115 is adapted to secure the rod 113 in its adjusted position and a cap 116 is arranged over the end of the rod 113 and the nut 115. The member 105 has an extension 117 screwed on the end thereof, and at the outer end of this extension, there is a plug 118 through which the rod 113 slides. A plurality of coil springs 114' are arranged between the cap 114 and the plug 118 and serve to move the sleeve 105 and head 106 so as to release the collet 109. A sleeve 119 is slidable axially within the extension 117 and this sleeve and the extension are provided with radial slots, to receive the wings 120, each of which has a pivot 121 transversely arranged in the spindle extension 88. A collar 122 is arranged on the extension 88 and protects the pivots 121. An axially shiftable collar 123 is arranged on the exterior of the spindle extension 88 and has cam surfaces 124 which cooperate with the wings 120, to move the latter inwardly, the wings also engaging abutments 125 on the sleeve 119, to move the latter axially against the pressure of the spring 126. The spring 126 is arranged within the sleeve 119 and bears against the internal flange at the end of the sleeve and against the plug 118. A plunger 127 is slidably mounted in the member 111 and a spring 128, which bears on a collar 129 on the plunger 127 and on the end of the rod 113, normally presses the plunger against the work A, and when the collet 109 is expanded and the work thereby released, the plunger 127 serves to eject the work from the collet.

A driving gear 130 for the spindle 85 is keyed to the latter and held in position thereon by the shoulder 131 and the nut 132.

Figures 3, 11, 13:
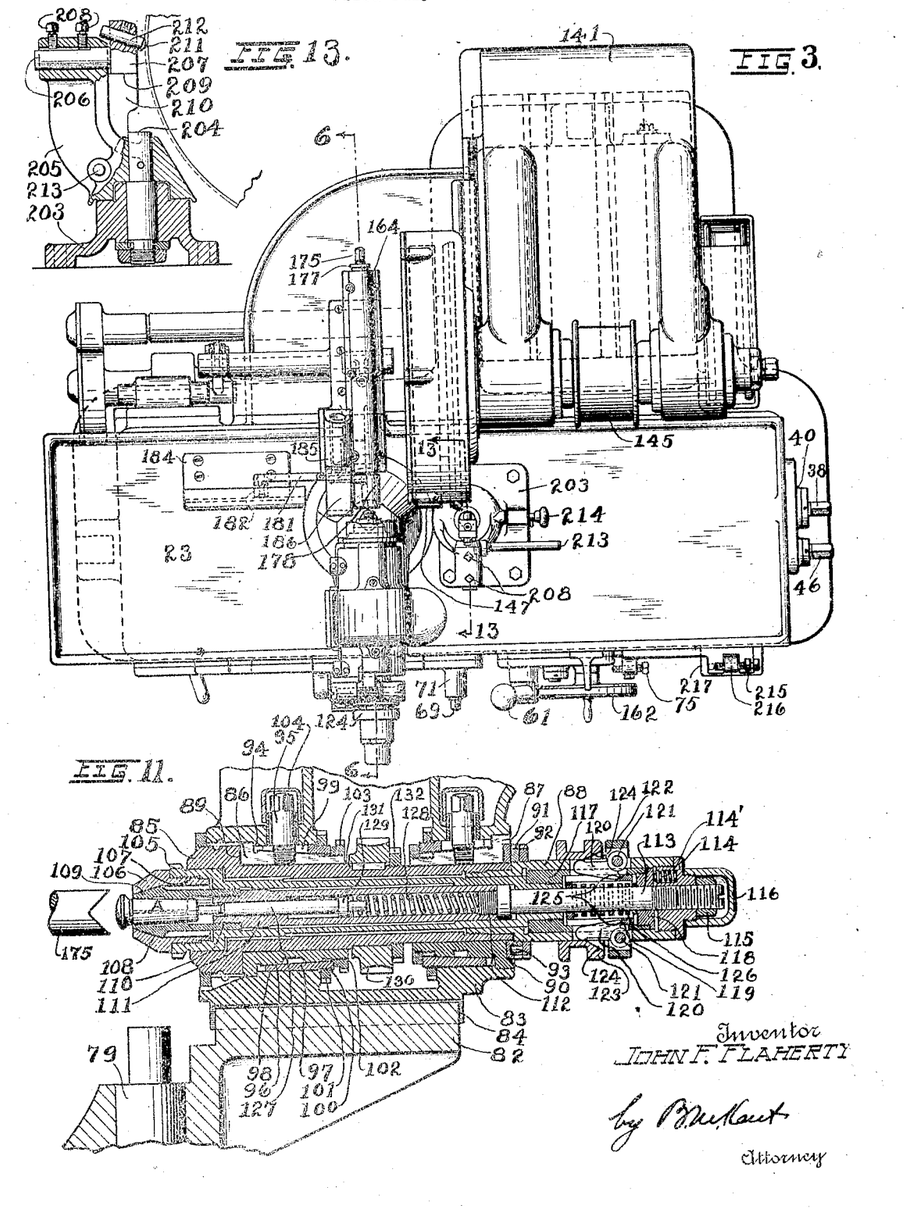
Fig. 3 is a plan view of the machine.
Fig. 11 is an enlarged section of the work-holder, the section being on the line 6—6 but looking in the opposite direction from the arrows.
Fig. 13 is an enlarged section on line 13—13 of Fig. 3.
Figure 4:
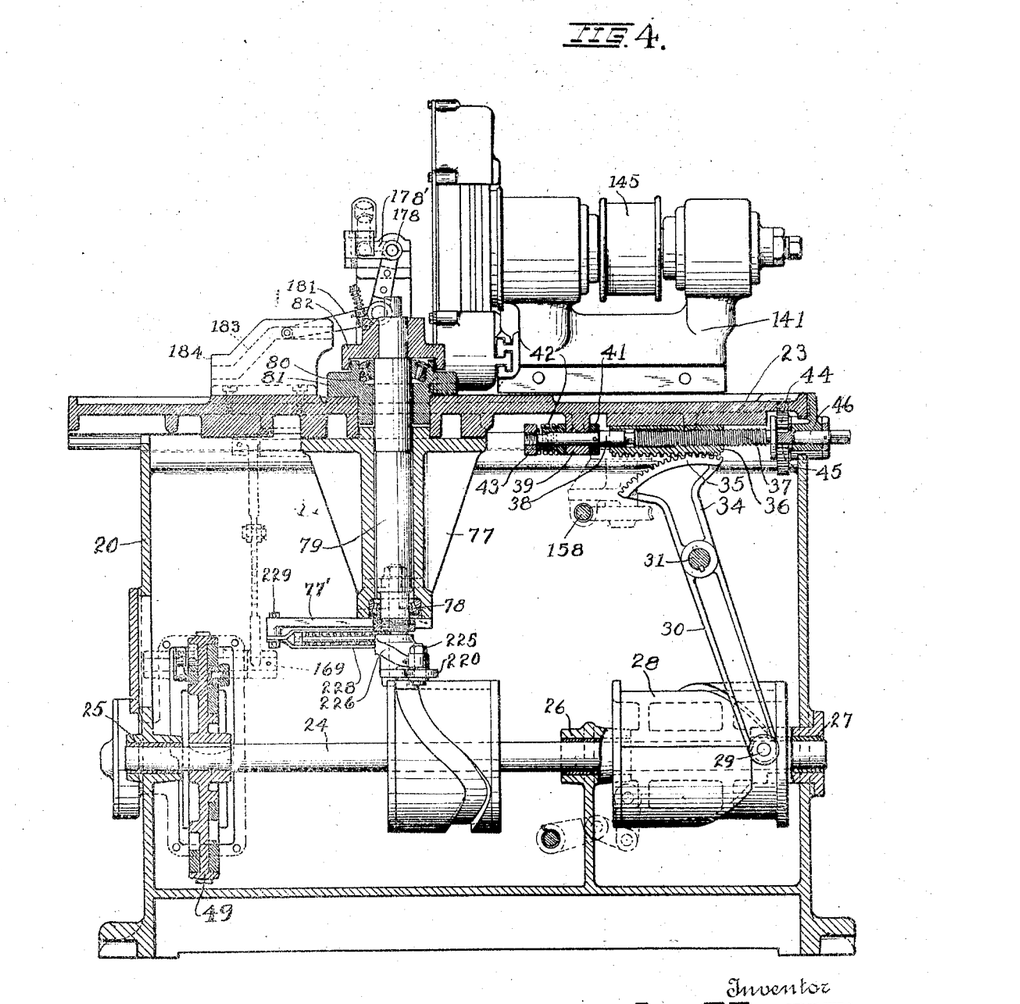
Fig. 4 is a longitudinal section substantially on the line 4—4 of Fig. 2.
Figure 5:
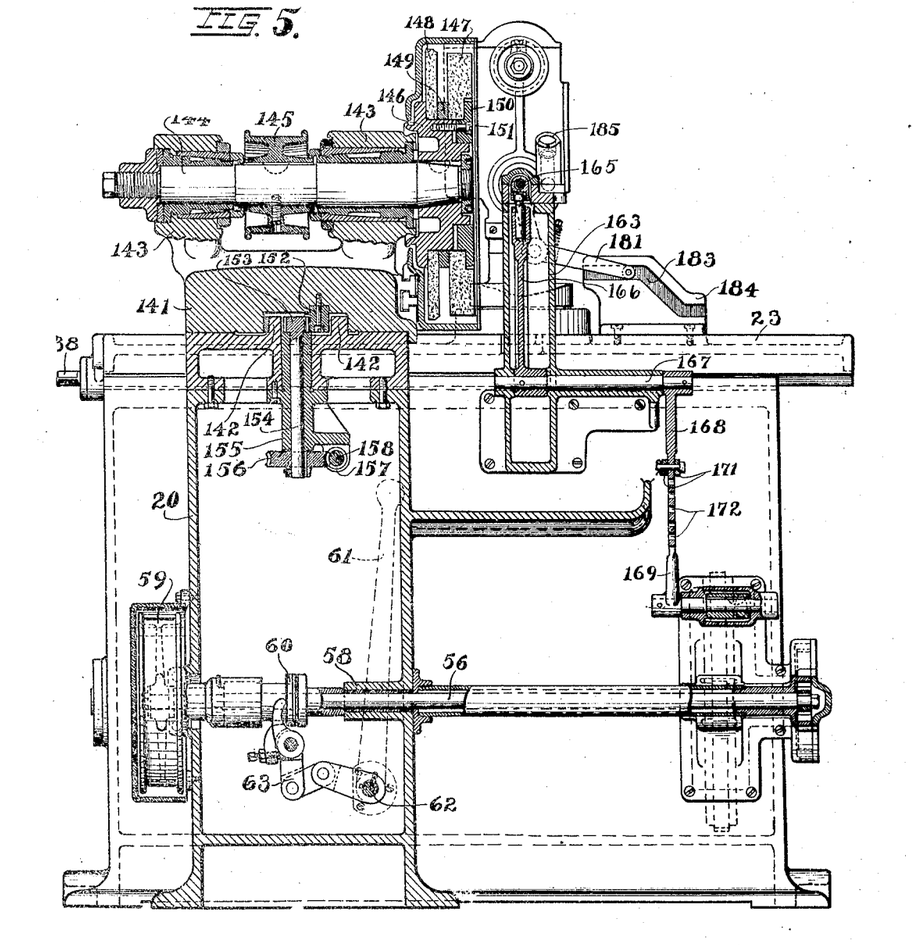
Fig. 5 is a transverse section on the line 5—5 of Fig. 2.

In the operation of the machine, the spindle 85 is rotated continuously, and when the work A is inserted in the collet 109, the plunger 127 is pushed in against the pressure of the spring 128 until the work reaches its proper position, when the collar 123 will be shifted to the position shown in Fig. 11, the inclined surfaces 124 drawing the wings 120 inward and the wings, in turn, moving the sleeve 119 toward the right and the latter, through the spring 126, drawing the sleeve 105 and the head 106 toward the right, so as to contract the collet 109 on the work and securely hold the latter. When the collar 123 is again shifted to the left, from the position shown in Fig. 11, the wings 120 will be allowed to swing outward and the springs 114' will move the sleeve 105 and head 106 to the left to effect the release of the collet 109, so that the plunger 127 can eject the work from the collet.

A vertical shaft 133 is arranged in the housing 83 and is provided with a spiral gear 134 at its lower end, which meshes with the gear 130, and with a spiral gear 135 at its upper end, which meshes with a gear 136 on a horizontal shaft 137. The shaft 137 is mounted in bearings 138 and 139 in the housing 83 and carries a pulley 140, by means of which it is driven from any suitably arranged source of power. Thus the spindle 85 is rotated from the shaft 137 through a train of spiral gearing and the spindle is thereby relieved of the usual vibrations inherent in a construction in which the spindle is driven directly by means of a belt. This improvement in the method of driving the spindle is claimed in my copending application, Serial No. 455,836, filed March 26, 1921.

A head 141 is slidably mounted on the bed 20, so as to have movement at right angles to the movement of the carriage 23. The head 141 is guided by the ways 142 which engage the sides of a slot in the under side of the head, and carries two bearing brackets 143 for a shaft 144, to which is keyed a pulley 145 and a hub or center 146 for the grinding wheels 147 and 148. These wheels are spaced apart by a collar or washer 149 and may be secured on the center 146 by means of a plate 150 and screws 151. The head 141 may be moved on the ways 142, for the purpose of moving the wheels 147 and 148 toward the work to compensate for wear, by means of a rack 152 which is secured to the head 141 between the ways 142, and with which meshes a pinion 153 on the shaft 154, the latter being mounted in a suitable bearing 155 and carrying, at its lower end, a worm gear 156. A worm 157, on the shaft 158, meshes with the gear 156 and the shaft 158 extends across the bed 20 and at its end is supported in a bearing 159. A gear 160 is keyed to the shaft 158 on the interior of the bed 20 and has in mesh therewith a pinion 161, which is a unit with the hand-wheel 162, by means of which it may be rotated.

Arranged alongside of the grinding wheels and spaced slightly therefrom, there is a hollow bracket 163 which has arranged at its upper end a bearing member 164, within which there is a tubular slide 165. The slide 165 is reciprocated by an arm 166 on the shaft 167 and this shaft also carries a downwardly projecting arm 168, which is connected with an arm 169 on the shaft 170, by means of a link 171, the arms 168 and 169 being each provided with several holes 172, for the purpose of permitting the link 171 to be changed to vary the throw of the slide 165. The shaft 170 is also provided with an arm 173 which projects into the bed 20 and cooperates with the cam 174 on the side of the gear 49, the cam 174 being suitably shaped to reciprocate the slide 165 in synchronism with the movements of the other parts of the machine.

Figure 1:
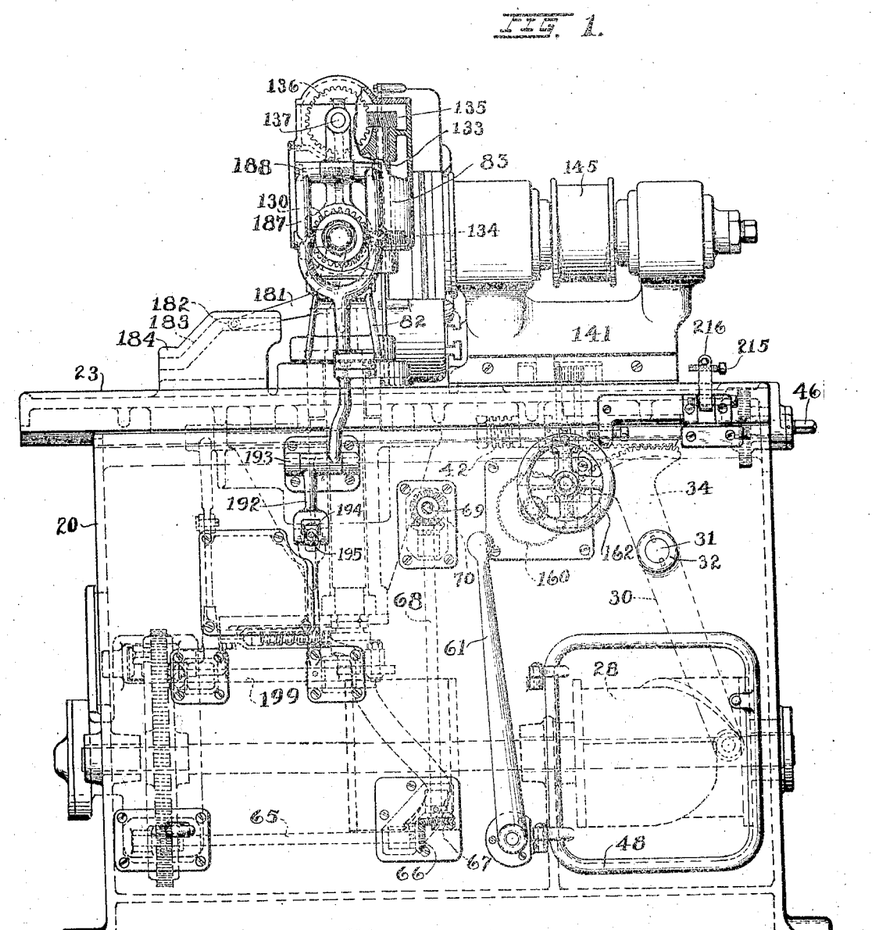
Figure 1 is a side elevation of a machine embodying my invention.

A push rod 175 is arranged in the slide 165 and is adjustable, with reference to the latter, by means of a threaded connection 176, the exposed end of the rod being squared to receive a wrench, and a lock nut 177 being provided to secure the rod in any position in which it is adjusted. A carrier 178 for the work is mounted on the arm 179, which is pivoted on the stub shaft 180, on the bracket 163. An arm 181, preferably formed integral with the arm 179, carries a cam roller 182 which cooperates with the cam slot 183, in the bracket 184 on the carriage 23. The cam slot 183 is shaped to cause a rocking movement of the carrier 178, so that when the carriage 23 is at the left-hand end of its stroke (as seen in Fig. 1), the carrier 178 will be in alinement with the rod 175. At this instant, the cam 174 will cause the rod 175 to move forward and push the article from the carrier 178 into the collet 109. The rod 175 will then be withdrawn by the cam 174 and the carrier 178 will be rocked by the inclined portion of the slot 183 to a position of rest in alinement with the feeder-chute 185, through which the articles are received by the machine. The articles may be fed by hand, or by any suitable automatic mechanism, to the feeder-chute 185, and when the carrier 178 is in alinement with the chute, the articles will move forward, by gravity, into the carrier 178, a stop 186 being arranged in connection with the chute to limit the forward movement of the article and to prevent its being forced entirely through and out of the carrier 178.

Figure 2:
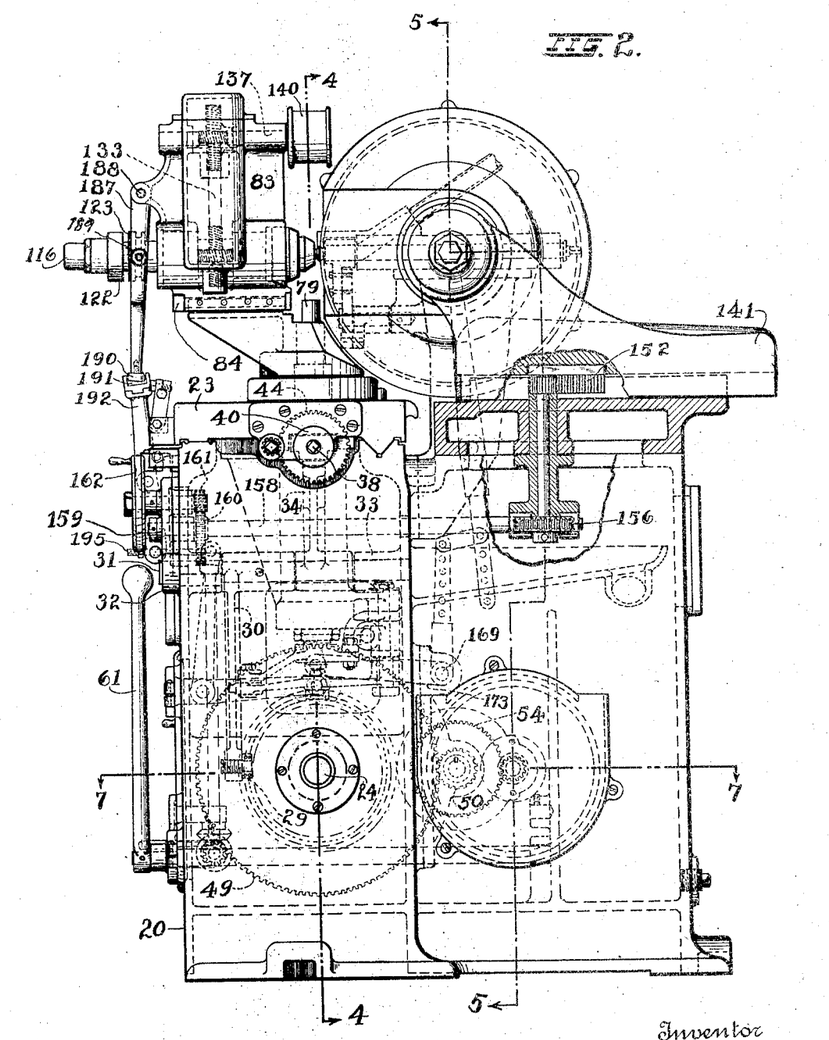
Fig. 2 is an elevation of the right-hand end of the machine as seen in Fig 1, certain parts being shown in section.

A yoke 187 (see Figs. 1, 2 and 6), is pivoted at 188, on the housing 83, and carries studs 189 which engage a circumferential groove in the collar 123, whereby oscillation of the yoke 187 will slide the collar 123 to actuate the collet 109. At the lower end of the yoke 187, there is a roller 190 which, during a portion of each stroke of the carriage 23, is arranged in a slot 191, in the upper end of the lever 192, whereby oscillation of the lever 192 will effect oscillation of the yoke 187. The lever 192 is pivoted at 193, on the bed 20, and in its lower end carries a block 194, this block having a pivotal connection with the lever 192 and carrying a rod 195, which is adjustably held by means of the nuts 196 on opposite sides of the block 194. The rod 195 is pivoted at 197 to the upper end of an arm 198 on the shaft 199, this shaft being supported in suitable bearings on the interior of the bed 20 and carrying an arm 200 having a roller 201 in its outer end, which cooperates with a cam slot 202 on the opposite side of the gear 49, from the cam 174. The slot 202 is suitably shaped to actuate the collet 109 so as to grip and release the work in synchronism with the movements of the other parts of the machine. The opening of the collet 109 occurs when the work is in line with the space between the grinding wheels and the bracket 163, on the movement of the carriage 23 to the left, as seen in Fig. 3, the article being ejected into said space by the plunger 127.

It is, of course, essential that the grinding surface of the wheels 147 and 148 be kept true, and for this purpose and in order that the dressing of the wheels may be done quickly and accurately, without disturbing the adjustment of the machine, I have mounted on the carriage 23, alongside the block 80, a bracket 203 on which there is a pivot 204, the axis of which is in accurate alinement, in the direction of movement of the carriage 23, with the axis of the shaft 79. The pivot 204 (see Fig. 13), carries a bracket 205 in which the shank 206 of a head 207 is slidably mounted, the shank being secured in any position to which it is adjusted, by means of set screws 208. The head 207 has a flat bottom surface, indicated at 209, which bears against a flat surface on the ledge 210 on the bracket 205. A diamond 211 is arranged in a holder 212 which is adjustably mounted in the head 207. The bracket 205 is provided with a handle 213, by means of which it may be swung back and forth, and a latch 214 is arranged for locking the bracket 205 in position.

When it is desired to dress the grinding wheels 147 and 148, the latch 214 is pulled out to release the bracket 205 which is then swung around from the position shown in Fig. 3 so that the diamond will pass the wheels when the carriage 23 is moved to position the diamond to the left of the grinding wheels. The bracket 205 is then swung back into the position shown in Fig. 3 and latched, and the carriage 23 moved to the right, to dress the wheel 147. The carriage 23 is moved, during this operation, by rotating the shaft 38. A stop 215, in the form of a screw adjustable in an arm 216 which is pivoted on the bracket 73, is adapted to engage the end 217 of the block 72 to position the diamond for dressing the curved part of the wheel 148. The stop 215 should accurately position the axis of the pivot 204 at the point where the axis of the shaft 79 is located when the work is swung for cooperation with the wheel 148. With the axis of the pivot 204 thus located, the diamond will dress the curved part of the wheel to the desired curvature. After the dressing of the wheels has been completed, the arm 216 is swung up into the position shown in Fig. 1, and the carriage 23 restored to its original position.

The oscillation of the shaft 79 is effected by means of a barrel-cam 218 on the shaft 24, a roller 219 on the lever 220 cooperating with this cam and effecting the oscillation of the lever. The lever 220 is mounted on a pivot 221 on an extension 222 of the bracket 77, and has a slot 223 in its outer end in which a block 224 is adapted to slide. A pivot 225 connects the block 224 with one end of a lever 226 that is keyed to the lower end of the shaft 79 so that the oscillation of this lever will effect the oscillation of the shaft 79. The opposite end of the lever is connected by a pivot 227 with one end of a telescopic link 229, the other end of which is connected with the arm 77' on bracket 77 by an anchor pivot 229.

In the operation of the machine, the articles are fed through the chute 185 into the carrier 178 when the carriage 23 is at the right-hand end of its stroke, as seen in Fig. 1. As the carriage moves to the left, the inclined portion of the cam slot 183 lifts the arm 181 and rocks the carrier 178 toward the right, so that when the roller 182 is in the upper horizontal portion of the cam slot, the carrier 178 will be in alinement with the rod 175 and the tail 178' on the carrier will cover the end of the chute 185 and retain the articles therein. When the carriage 23 reaches the left-hand end of its stroke, the collet 109 will be in alinement with the carrier 178, as shown in Fig. 3. The collet 109 will be open and, at this instant, the rod 175 will be actuated to push the article into the collet against the pressure of the plunger 127. The end of the rod 175 is suitably formed to accurately locate the work and where the articles to be ground are bearing rollers, as shown in Fig. 11, the end of the rod 175 is preferably V-shaped, to engage with the marginal portion of the end of the article, this being the surface to be ground. The articles are thus accurately and uniformly located in the collet and as soon as they are positioned, the collet grips them and the rod 175 is withdrawn. The carriage 23 then carries the end of the article across the wheel 147 to grind a central flat portion thereon. At the end of the stroke of the carriage, the stop 75 will engage the surface 217, to accurately position the axis of the shaft 79. This shaft is then oscillated to carry the work across the curved surface of the wheel 148, the carriage 23, in the meantime, remaining stationary. At the completion of the oscillation of the shaft 79, the carriage 23 moves toward the left and when the article is opposite the space between the grinding wheels and the bracket 163, the collet releases the article and the plunger 127 ejects it into this space. The cycle of operations is then repeated with another article.

While I have described the principles of my invention and illustrated one application thereof for grinding a spherical surface on the end of an article, it will be understood that various changes may be made in the details of construction, without departing from the spirit of the invention, which is defined in the appended claims.

Having thus described my invention, what I claim is:—

1. In apparatus of the class described, the combination of two axially spaced grinding wheels, means for moving the work parallel to the grinding face of one of said wheels, and automatically operating means for oscillating the work for cooperation with the second wheel after it leaves the first wheel.

2. In apparatus of the class described, the combination of two axially spaced grinding wheels, means for moving the work parallel to the grinding face of one of said wheels, and automatically operating means for oscillating the work about a pivot while being operated upon by the second wheel.

3. In apparatus of the class described, the combination of a plurality of grinding wheels, one of which has a straight grinding face and the other of which has a curved grinding face, and means for automatically moving the work parallel to said straight grinding face while being operated upon thereby and for oscillating the work about the center of said curved face while being operated upon thereby.

4. In apparatus of the class described, the combination of a plurality of coaxial grinding wheels, a carriage movable parallel to the axis of said wheels, an oscillating work-holder on said carriage, means for holding said work-holder stationary with respect to said carriage while the latter is moving, and automatically operating means for oscillating said work-holder at the end of the stroke of said carriage.

5. In apparatus of the class described, the combination of a plurality of grinding wheels adapted for successive operation on the work, a reciprocating carriage, an oscillating work-holder on said carriage, means for oscillating said work-holder at one end of the stroke of said carriage, means for feeding the work to said holder at the opposite end of the stroke of the carriage, and means for discharging the work from the holder while the carriage is in motion.

6. In a grinding machine, the combination of a carriage, a work-holder on said carriage adapted to be swung about an axis to move the work in a curved path while being acted upon by a grinding wheel, a wheel-dressing device mounted on said carriage and adapted to be swung about an axis parallel to the axis of the work-holder, and a plurality of stops cooperating with said carriage to accurately position the work or said device interchangeably in operative relation to the grinding wheel.

7. In a grinding machine, the combination of a carriage, a work-holder on said carriage adapted to be swung about an axis to move the work in a curved path while being acted upon by a grinding wheel, a wheel-dressing device on said carriage adapted to be swung about an axis parallel to the axis of the work-holder, and means whereby said carriage may be accurately positioned with either of said axes at the same point to interchangeably locate said work-holder or said device in operative relation to the grinding wheel.

8. In a grinding machine in which a work holder is mounted to swing about an axis to move the face of the work to be ground in a curved path upon a carriage movable into and out of operative position in relation to the grinding wheel, a grinding wheel-dressing device upon said carriage mounted so as to be swingable upon an axis parallel to that upon which the work-holder swings, and spaced therefrom in substantially the direction of the carriage motion so that the dressing tool may be placed interchangeably with the work-holder in operative relation to the grinding wheel.

In testimony whereof I affix my signature.

JOHN F. FLAHERTY.